United States Patent [19]
Grebe

[11] Patent Number: 5,339,196
[45] Date of Patent: Aug. 16, 1994

[54] OPTICAL DEVICE FOR MEASURING THE SPEED OF A MOVED SURFACE BY MEANS OF A MEASURING LIGHT BEAM FROM A LASER

[75] Inventor: Volker Grebe, Dortmund, Fed. Rep. of Germany

[73] Assignee: Mesacon Gesellschaft fur MeBtechnik MbH, Fed. Rep. of Germany

[21] Appl. No.: 859,375
[22] PCT Filed: Sep. 27, 1991
[86] PCT No.: PCT/EP91/01854
§ 371 Date: May 27, 1992
§ 102(e) Date: May 27, 1992
[87] PCT Pub. No.: WO92/06388
PCT Pub. Date: Apr. 16, 1992

[30] Foreign Application Priority Data
Sep. 27, 1990 [DE] Fed. Rep. of Germany ... 9013557[U]

[51] Int. Cl.⁵ .................. G02B 27/10; G02B 5/04; G01P 3/68
[52] U.S. Cl. ................ 359/640; 356/358; 359/834
[58] Field of Search .............. 359/618, 834, 640; 356/358, 357

[56] References Cited

U.S. PATENT DOCUMENTS

| | | | |
|---|---|---|---|
| 1,253,137 | 1/1918 | Brewster | 359/640 |
| 1,579,806 | 4/1926 | Ball et al. | 359/640 |
| 2,265,264 | 12/1941 | Bunger et al. | 359/618 |
| 4,787,710 | 11/1988 | Durell | 359/834 |
| 4,916,529 | 4/1990 | Yamamoto | 359/640 |
| 4,948,257 | 8/1990 | Kaufman et al. | 356/354 |

FOREIGN PATENT DOCUMENTS

933540 4/1948 France.

*Primary Examiner*—Jon W. Henry
*Attorney, Agent, or Firm*—Banner, Birch, McKie & Beckett

[57] ABSTRACT

The invention relates to an optical device which serves in particular for measuring the speed of a moved surface with the aid of a measuring beam from a laser. The measuring beam is split into two parts, directed through prisms to converge towards the moved surface and received again frequency-shifted by the Doppler effect. For each part beam there is a single prism body through which each part beam is guided outwards to intensify splitting and is deflected to bring about convergence. Each prism is preferably secured to a plane-parallel glass plate so that very good, lasting adjustment is possible.

3 Claims, 3 Drawing Sheets

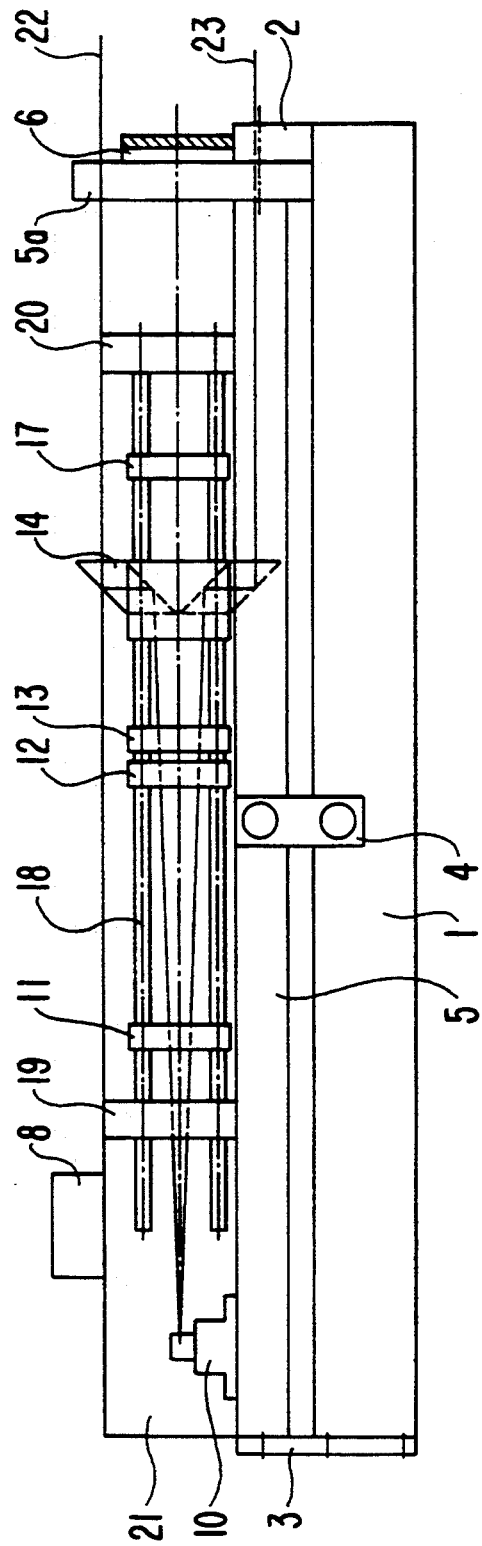
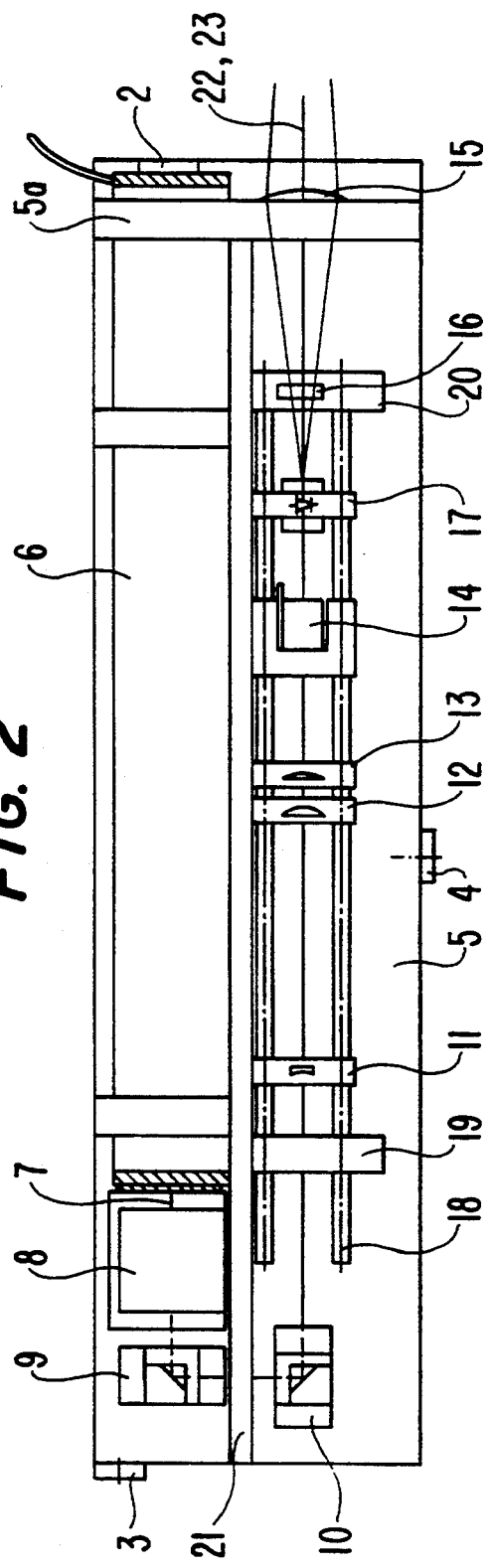

OPTICAL DEVICE FOR MEASURING THE SPEED OF A MOVED SURFACE BY MEANS OF A MEASURING LIGHT BEAM FROM A LASER

The invention relates to an optical device, in particular for measuring the speed of a moved surface, by means of a measuring light beam from a laser, this beam being split into two part beams which are directed in a transmitting prism to converge through prisms towards the moved surface.

In a known optical device of the above type for measuring lengths and speeds, a light beam from a laser—the term "laser" is used for a laser resonator for the sake of simplicity—is split into two part beams which are directed at different angles to the moved surface, in particular that of an object whereof the speed or length is to be measured continuously. The laser light reflected and scattered by this surface is detected by optical means and supplied to a photodetector for evaluation. Since both part beams arrive at the same location on the surface of the object to be measured, the scattered light waves which are Doppler-shifted to a different extent are overlaid. This results in a beat whereof the frequency is proportional to the speed of the moved surface. The speed or length sought can be determined continuously from the modulation frequency and represented or displayed.

In a known optical device of this type, the two part beams, either parallel or diverging, enter two prisms which are arranged mirror-symmetrically with respect to one another, and there the part beams are deflected outwards with reference to their center plane to intensify beam splitting. They leave the prisms in a parallel alignment, in the case of part beams which enter parallel through correspondingly parallel reflection surfaces of the prisms. In order that the part beams intersect at a predetermined point of intersection, each part beam is then guided through a wedge-shaped prism which, for the angular adjustment of the part beam concerned, is arranged to be adjustable on a mounting, in particular to be rotatable about an axis of rotation parallel to the center plane between the two prisms. Consequently, for precise angular adjustment of the part beams a very precise adjustment has to be set and in particular this has also to be maintained in all the circumstances of practical operation. On the one hand, the input prisms each have to be adjusted with respect to the succeeding wedge prisms, and on the other hand the angular adjustment of the wedge prism has to be adjusted with respect to the angle of intersection of the emerging part beam with the center plane between the prism arrangements. In other words, four individual prisms have to be matched precisely to one another as regards the position and angle of their reflective and refractive surfaces. This is because the Doppler frequency for example depends in a crucial way on the angle of intersection of the two part beams, and this angle of intersection is established by the transmitting prism.

It is particularly problematic to maintain an adjustment of the prisms by gluing the prisms, which, in particular in the case of heat expansion to which the individual prisms are exposed, cannot prevent the mutual position of the reflective and also the refractive surfaces of the prisms and thus also the angle of intersection of the part beams emerging from the wedge prisms with the center plane from altering accordingly.

The expense for the production of four individual prisms and their adjustable arrangement with respect to one another is also considerable and makes the production of the device correspondingly more expensive.

In another known optical device, two prisms are glued to one another, and the measuring light beam enters these prisms unsplit and is split by an appropriate arrangement of the reflective and refractive surfaces into two part beams which are guided outwards—in relation to the center plane—for beam splitting in the prisms and emerge parallel from the prisms. Downstream of the two prisms there is arranged a lens which deflects the part beams to converge so that they meet at the predetermined point of intersection. This optical arrangement also requires a high level of expense for production. In the case of a coaxial beam path, lenses of large diameter are required, and these are correspondingly expensive and their optical quality in the edge regions where the beams pass through decreases significantly, in particular the focal length being imprecise, so that the predetermined angle of intersection of the two part beams can only be precisely adjusted with great difficulty. The other disadvantages which have already been presented for the optical device described above also apply to this device, in particular the problems associated with gluing the prisms.

It is thus the object to provide a transmitting prism for an optical device of the type mentioned at the outset which can be produced at relatively low expense and is easily adjustable, and in which furthermore the adjustment carried out on setting up the device is maintained, and which in particular is largely independent of environmental influences such as the effects of heat, jarring etc.

This object is achieved, in accordance with the invention, in that there is provided for each part beam a prism comprising a single prism body, in that the refractive and reflective surfaces on the prism are chosen and inclined such that the part beam entering the prism is guided outwards in relation to the center plane to intensify beam splitting and is deflected to bring about convergence of the two emerging part beams, and in that the prisms are secured by their base surfaces, plane-parallel and adjusted, to a planar plate, in particular a plane-parallel glass plate which can be received in a mounting.

The invention consequently takes a new course in that the prisms and other optical elements for intensifying splitting of the part beams or in general for splitting a measuring light beam into two part beams and for deflecting the part beams to achieve the required convergence are combined for each part beam in a single prism body, and this pair of prisms is permanently secured, with precise adjustment with respect to one another, to a planar plate which is preferably to be a plane-parallel glass plate. This structural arrangement of the components allows the prisms to be produced and at the same time to be secured to a plane-parallel glass plate by a manufacturer of optical glasses, so that the expense for production and for permanent adjustment is kept relatively small. This is because the manufacturer of the optical device only needs to process the prisms as finished components which are already adjusted on the glass plate with respect to one another and with respect to the plate itself.

Difficult adjustment in any case becomes unnecessary, since the means required for intensifying beam splitting and for bringing about beam convergence are restricted in accordance with the invention to the refractive and reflective surfaces of the two prisms. The problems of undesired shift or offset of the prisms, with the necessity of subsequent adjustment as in the case of the prior art, are eliminated. In principle, certain inaccuracies in the mounting position even become uncritical, as will become clear below. The temperature problems of known devices are also small, since the prism arrangement according to the invention has the advantage of homogeneous material. The securing and adjustment of the prisms by their base surfaces to a plane-parallel glass plate ensures a very high degree of accuracy of the parallelity or plane-parallel alignment of the two prisms with respect to one another, and the glass plate itself can easily be received, as will be described below, in a mounting which for its part can be inserted with precise positioning in the optical device.

A crucial factor is that the invention allows precise adjustment of the angle of intersection between the transmitting beams or the two part beams in a simple manner, and the maintenance of this adjustment is also independent of temperature-related and/or mechanical effects, so that the transmitting prism in the optical device is simple, reliable and maintenance-free.

The advantages of the invention become particularly clear if the two prisms comprise two approximately rhombohedral prisms which are each secured by one of their approximately parallelogram-shaped base surfaces to the planar plate and are arranged there mirror-symmetrically one above the other with respect to a center plane perpendicular to the side surfaces and are arranged such that the part beams divergently entering the prisms are spread to a greater spacing from one another and emerge convergently from the prisms, converging on a con, non point of intersection.

The limit surfaces of the approximately rhombohedral prisms, determining the beam path, are positioned with respect to one another with a very high accuracy by the manufacturer of optical glasses, so that in practice the refractive and reflective surfaces always have the assignment given them by the manufacturer. In accordance with the invention, it is provided for the part beams divergently entering the approximately rhombohedral prisms and emerging convergently therefrom each to be subject to a refraction at the inlet surface, each to be subject to a reflection at the first and second counter-surfaces, and each to be subject to a renewed refraction at the outlet surface. Preferably, in this case the part beam is refracted at the inlet surface in each case towards the entry slot and is refracted at the outlet surface in each case away from the entry slot. However, refraction at the outlet surface can also have the value zero, as will become clear below.

For shaping the approximately rhombohedral prisms provided according to the invention, it is further provided that the angle of inclination of the second counter-surface to the center plane is slightly smaller than the angle of inclination of the first counter-surface with respect to the center plane. This already provides the convergence of the part beams leaving the outlet surface.

However, it is preferable that the angle of inclination of the second counter-surface to the center plane should be slightly smaller than the angle of inclination of the first counter-surface with respect to the center plane, and, in conjunction with this position of the second counter-surface, that the outlet surface of each prism should be inclined outwards by such a small angle with respect to a first plane perpendicular to the center plane that a predetermined convergence of the emerging part beams is achieved without refraction at the outlet surface. The angle is dependent on the angle of inclination of the second counter-surface to the center plane. In each case, in accordance with this further development of the invention, refraction at the outlet surface can be eliminated, so that the accuracy of measurement of the optical device becomes almost completely independent of temperature fluctuations.

The prisms are preferably secured to the plane-parallel glass plate by means of an optical adhesive. This means of securing is resistant to mechanical and heat-related influences, since the coefficients of heat expansion of the materials glued together are the same.

The mounting of the component comprising the two prisms and the glass plate is to be insertable in simple manner into a mounting which for its part can be produced at low expense and can be integrated in the beam path securely and in a manner which is easy to adjust. For this, it is provided in accordance with the invention for the mounting to comprise a base plate having two cheeks which extend perpendicularly from the base plate and are arranged parallel and with an intermediate space and are provided with plane-parallel surfaces, for the base plate to have a window for the part beams to pass through, and for the cheeks to form in the intermediate space a receiver for the component comprising the plate and the two prisms. The cheeks, which are connected to one another by way of the base plate, keep the prism component in the necessary parallel arrangement with respect to the mounting because of their plane-parallel surfaces. This mounting can be produced in a simple manner and ensures a reliable, resistant and easily produced arrangement of the prism component in the optical device.

For a simple and reliable assembly of the prism component, it is provided according to the invention for the receiver to comprise a plane-parallel support surface against one of the cheeks as a bearing surface for the plate and a clamping apparatus constructed on the other cheek, for example a clamping screw with a corresponding threaded bore in the other cheek.

The construction chosen for the mounting, comprising a base plate having two cheeks extending perpendicularly from the base plate, enables the mounting to be reliably received and guided in a conventional four-rod mounting of the optical device, by means of which the other components lying along the beam path are also secured and arranged with respect to one another. For this, in accordance with the invention bores for receiving the four-rod mounting extend through the base plate and through the cheeks. Because the rods are guided through the base plate and the cheeks over the width thereof, a long and correspondingly precise guidance of the prism mounting on the four rods is produced.

As the result of the optical conditions according to the invention, not only is the precise position of the prism component in the mounting uncritical, in any case in relation to the position of the prism component in corresponding vertical planes, but the position of the two rhombohedrons with respect to one another is also uncritical. A relative vertical displacement or rotary movement of the rhombohedral prisms in a vertical plane does not change anything regarding the predetermined position of the emerging part beams or the angle of intersection thereof. Naturally, it is a prerequisite that the part beams through the inlet surfaces of the prisms should be able to enter the latter.

An example embodiment of the invention is explained below in more detail with reference to the drawing, in which:

FIG. 1 shows a side view of an optical device for measuring the speed of a moved surface by means of a measuring light beam from a laser;

FIG. 2 shows a plan view.

Figure 4:
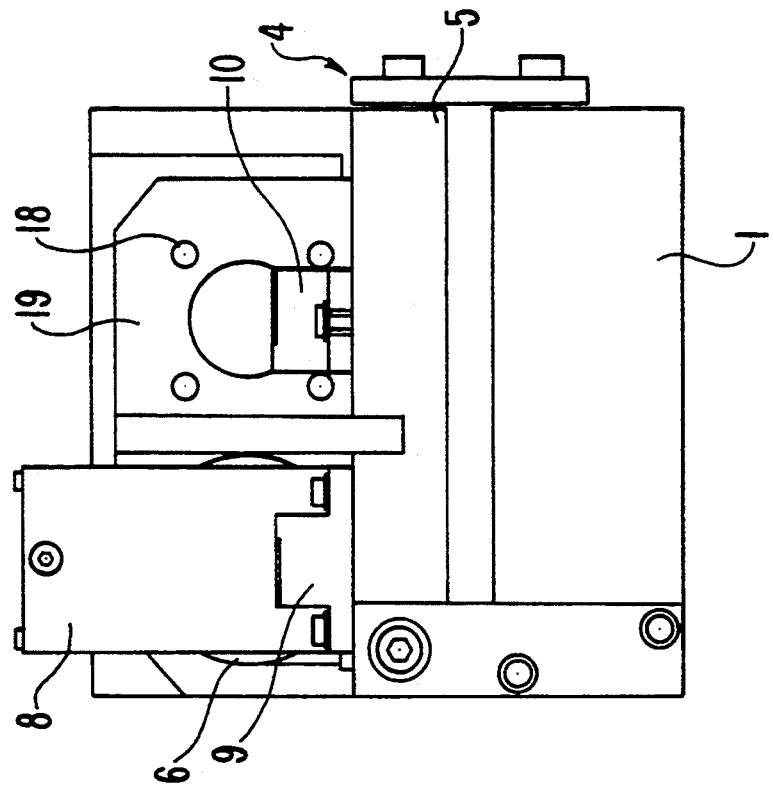
FIG. 3 shows a front view and FIG. 4 shows a rear view of the device in FIG. 1.
Figure 3:
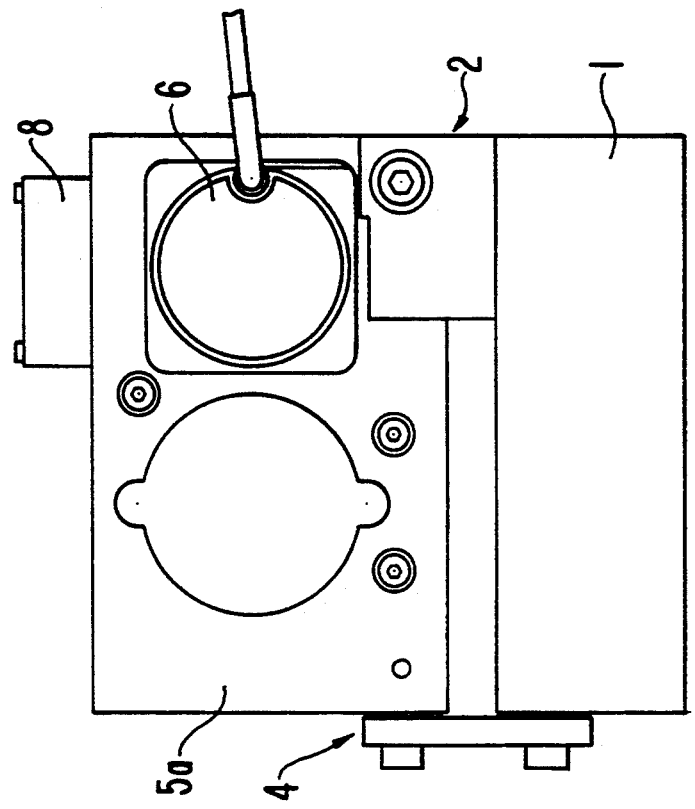

The optical device illustrated in FIGS. 1, 2, 3 and 4 substantially comprises a base plate 1 and a bottom plate 5 which is mounted by way of three support bearings 2, 3 and 4 spaced above the base plate 1 and movable in relation thereto, and on which there are arranged a laser 6 and an optical assembly, and to which there is secured an end plate 5a, as shown by the drawing.

The optical assembly comprises, as seen in the direction of the laser beam 7 from the laser 6, a Bragg cell 8, two deflecting prisms 9, 10, a dispersing lens 11, a focusing lens 12, a cylindrical lens 13, a transmitting prism 14, a receiving lens 15, an interference filter 16 and an avalanche photodiode 17. The elements 11, 12, 13, 14 and 17 are arranged on a conventional four-rod mounting 18 which is in turn mounted on two plates 19, 20. The plates 19, 20 are attached to the longitudinal plate 21 arranged upright on the bottom plate 5 and to the bottom plate 5.

The measuring process is not the subject of the invention. For this reason, all that will be said about the function of the optical assembly here is that the laser beam 7 from the laser 6 is dispersed by the optical assembly into two part beams 22, 23 which are directed, starting from the main transmitting prism 14, as measuring beams at different angles, to a moved surface (not illustrated) of an object. Doppler-shifted dispersed light returning from the surface is guided through the receiving lens 15 to the avalanche photodiode 17. Here, the speed of the moved surface is determined by means of evaluation electronics from a beat inherent in the dispersed light. It is clear from this sequence that the accuracy of measurement depends very substantially on maintaining constant an adjusted mutual position of the optical structural elements concerned.

Figure 5:
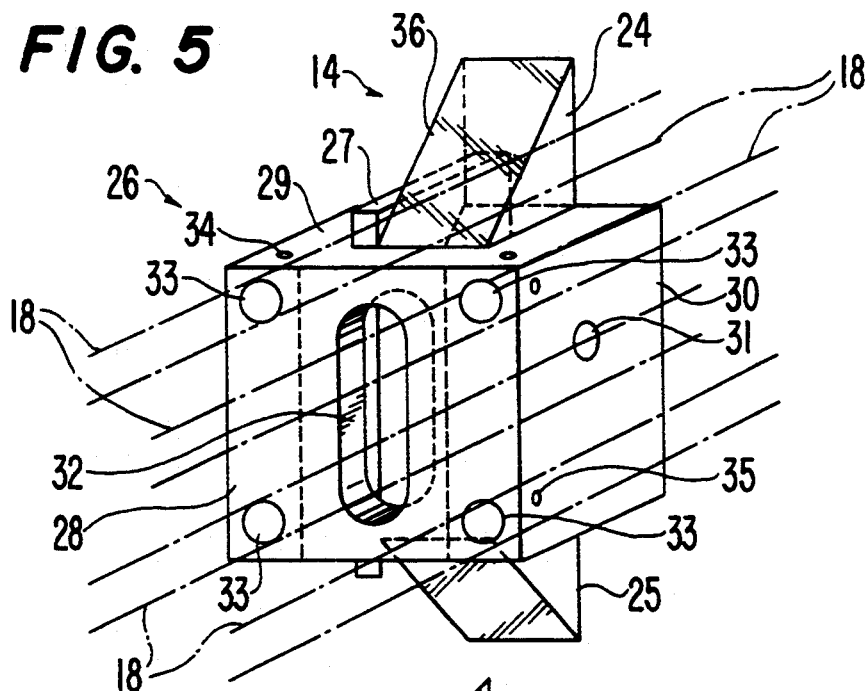
FIG. 5 shows a perspective view of a transmitting prism in a mounting.
Figure 6:
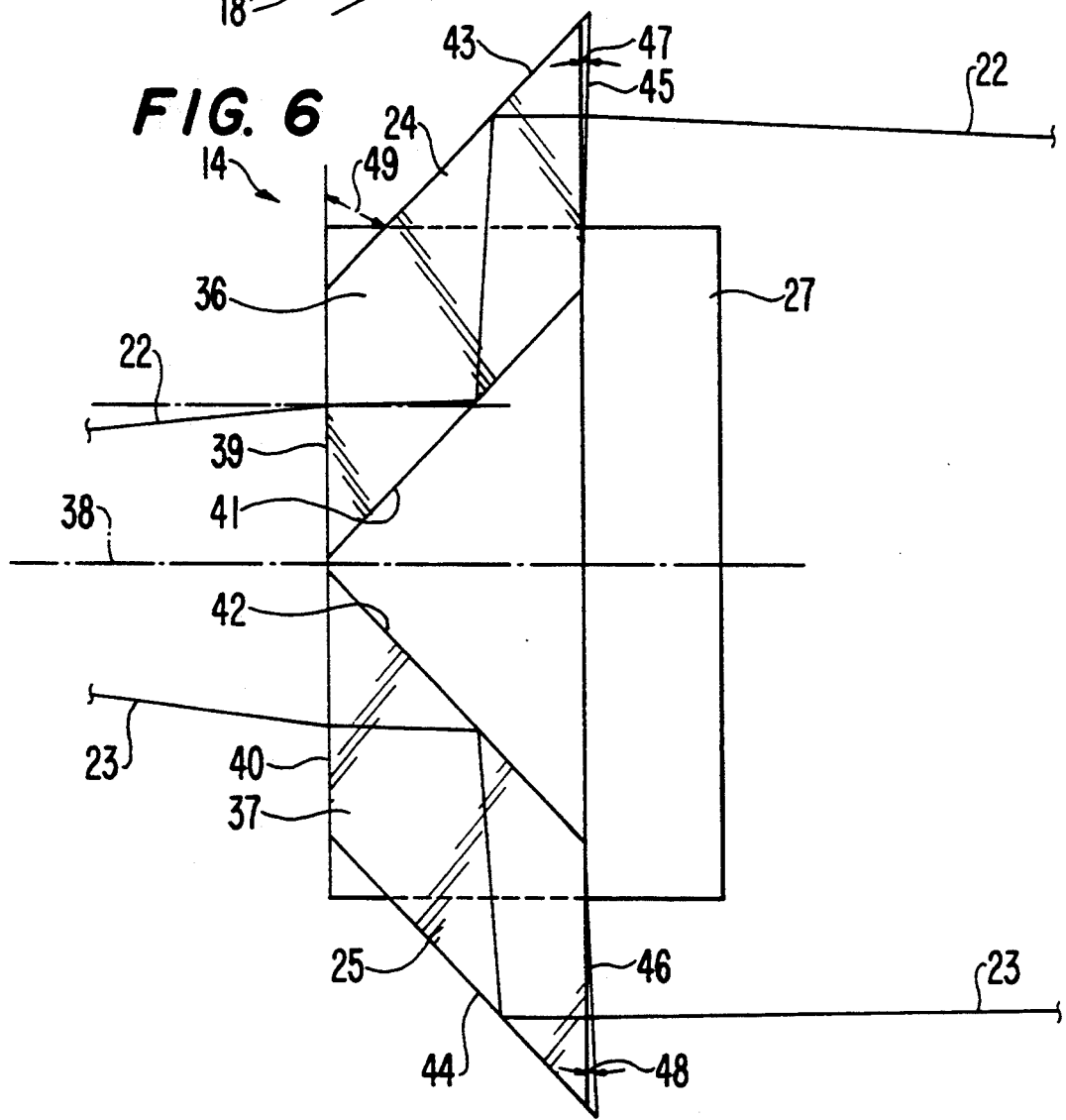
FIG. 6 shows a side view of the transmitting prism secured to a glass plate of optical glass.

The transmitting prism 14 is illustrated in detail in FIGS. 5 and 6 and is explained below. It comprises an upper and a lower rhombohedral prism 24, 25 which are secured plane-parallel in precise adjustment by means of an optical adhesive by their base surfaces 36, 37, in the arrangement which can be seen from the drawing, to a rectangular plate 27 which is of an optical glass, in a preferred embodiment of BK 7.

The plate 27 forms, with the transmitting prism 14, a complete optical component and is inserted in the mounting 26 with the plate 27 in large-surface contact and is fixed by means of a clamping apparatus in an adjusted position.

For this, the mounting 26, which is of metal, comprises a base plate 28 having a window 32 for entry of the part beams 22, 23 and two cheeks 29, 30 which extend at right angles from the side edges of the base plate 28 and which are preferably in a one-piece construction with the base plate 28. The component comprising the transmitting prism 14 and the plate 27 is arranged in the intermediate space between the cheeks 29, 30 and is secured in an adjusted position by means of a fixing screw (not illustrated) which may be screwed into a threaded bore 31 in the cheek 30.

The rods of the four-rod mounting 18 illustrated in FIGS. 1 and 2 extend through four bores 33 which are each arranged in the corner regions of the square base plate 28 and extend through the base plate 28 and the adjacent cheeks 29, 30. The mounting 26 is fixed to the four-rod mounting 18 in a predetermined position by means of fixing screws (not illustrated) which may be screwed into threaded bores 34, 35 illustrated by way of example.

The part beams 22, 23 divergently entering the transmitting prism 14, that is to say the rhombohedral prisms 24, 25 (cf. FIG. 6), first meet the inlet surfaces 39, 40 of the prism 24, 25, are refracted there towards the entry slot, are reflected substantially outwards—in relation to the center plane 38—by the first counter-surfaces 41, 42 of the prisms 24, 25 to intensify beam splitting, then meet the second counter-surfaces 43, 44 of the prisms 24, 25, and from there are reflected by the outlet surfaces 45, 46 to emerge convergently.

As a result of the position of the refractive and reflective surfaces of the prisms 24, 25 and their precisely determined position in a mirror-symmetrical arrangement with respect to the center plane 38 on the plate 27, the two functions of intensifying beam splitting and bringing about convergence of the two part beams 22, 23 are achieved at a predetermined angle of intersection. For this, the first two counter-surfaces 41, 42 have a position of 45° with respect to the center plane 38, while the second counter-surfaces 43, 44 each have an angle of inclination 49 with respect to the perpendicular to the center plane 38 which is slightly above 45°, and the two outlet surfaces 45, 46 are inclined forwards with respect to the perpendicular by a small angle of 47° or 48° such that the part beams leave the outlet surfaces 45, 46 without being refracted. Here, the additional angle of inclination of each angle 49 which exceeds 45° is approximately half the size of the angle of inclination 46, 47 with respect to the perpendicular. The precise angles and dimensions should be determined in accordance with known optical laws.

However, it is essential for the function of the transmitting prism 14 for the angle of intersection to be invariable by constructing the two prisms 24, 25 according to the invention, in particular in each case by using only a single prism body therefor, and by the position, which is uncritical within certain limits, of the two prisms 24, 25 with respect to one another and on the plate 27. The transmitting prism 14 is thus insensitive to for example a vertical offset, and therefore to shifts in the perpendicular and to rotary and pivotal movements in the mounting 26, as was already explained in detail at the outset. Only wobbling movements, in which the base surfaces 36, 37 leave the perpendicular plane assigned to them, could result in the position of the point of intersection of the part beams 22, 23 being changed.

I claim:

1. An optical device for measuring the speed of a moving surface through utilization of a laser beam split into two sub-beams, said optical device comprising:
  a transmitting prism arrangement comprising two prism bodies, each of said prism bodies being associated with one of said sub-beams;

each prism body having base surfaces, refractive surfaces and reflective surfaces arranged and oriented for allowing said associated sub-beam to enter said respective prism body to be guided in said respective prism body and to leave said respective prism body;

said sub-beam leaving said prism body being displaced outwardly in relation to a center plane of said transmitting prism arrangement between said prism bodies so that the degree of beam splitting is increased and said sub-beams converge on a common point of intersection;

said prism bodies being secured at a glass mounting plate and said base surfaces of said prism bodies being arranged in a plane-parallel manner.

2. The optical device according to claim 1 wherein each prism body comprises a rhombohedral prism which is secured to said glass mounting plate by one of its base surfaces, said rhombohedral prisms being arranged so that they mirror symmetrically with respect to said center plane of said transmitting prism arrangement where the center plane is perpendicular to the base surfaces of said rhombohedral prisms, said rhombohedral prisms also being arranged so that said two sub-beams divergently enter said rhombohedral prisms and when leaving them are spread to a greater distance from one another to ultimately converge on said common point of intersection.

3. The optical device according to claim 1 wherein each said sub-beam is subjected to a refraction effect at an inlet refraction surface of said associated prism body and is subjected to a reflection effect at both a first reflecting counter surface and a second reflecting counter surface of said associated prism body, each said sub-beam is further subjected to a refraction at an outlet refraction surface of said associated prism body.

\* \* \* \* \*